United States Patent [19]
Hirakawa

[11] Patent Number: 5,172,274
[45] Date of Patent: Dec. 15, 1992

[54] LARGE APERTURE, MEDIUM TELEPHOTO LENS SYSTEM

[75] Inventor: Jun Hirakawa, Tokyo, Japan

[73] Assignee: Asahi Kogaku Kogyo K.K., Tokyo, Japan

[21] Appl. No.: 867,083

[22] Filed: Apr. 14, 1992

Related U.S. Application Data

[63] Continuation of Ser. No. 592,391, Oct. 3, 1990, abandoned.

[30] Foreign Application Priority Data

Oct. 9, 1989 [JP] Japan ................................. 1-263726

[51] Int. Cl.$^5$ ............................................ G02B 13/02
[52] U.S. Cl. ....................................... 359/745; 359/746
[58] Field of Search ............... 350/454, 455, 456, 457; 359/745, 746

[56] References Cited

U.S. PATENT DOCUMENTS 3,948,584  4/1976  Basista et al. .................... 350/454 X

FOREIGN PATENT DOCUMENTS

| | | |
|---|---|---|
| 2540520 | 3/1976 | Fed. Rep. of Germany . |
| 2658289 | 7/1977 | Fed. Rep. of Germany . |
| 59-8803 | 2/1984 | Japan . |
| 59-48723 | 3/1984 | Japan . |
| 63-205625 | 8/1988 | Japan . |
| 64-78208 | 3/1989 | Japan . |
| 1-154111 | 6/1989 | Japan . |
| 1-154112 | 6/1989 | Japan . |

Primary Examiner—Scott J. Sugarman
Attorney, Agent, or Firm—Sughrue, Mion, Zinn, Macpeak & Seas

[57] ABSTRACT

A large aperture, medium telephoto lens system is disclosed which is composed of a front group $G_F$ that comprises, in order from the object side, at least two positive lens elements having a strong convex surface directed toward the object and a negative lens having a strong concave surface directed toward the image and which has a positive overall refractive power, and a rear group $G_R$ with a surface $S_{R1}$ which is the closest to the object being convex toward the object and which the a positive overall refractive power, with only the rear group $G_R$ being moved along the optical axis to perform focusing operations.

12 Claims, 10 Drawing Sheets

LARGE APERTURE, MEDIUM TELEPHOTO LENS SYSTEM

This is a continuation of application Ser. No. 07/592,391 filed Oct. 3, 1990, now abandoned.

BACKGROUND OF THE INVENTION

The present invention relates to an imaging lens system for use in cameras such as an SLR camera. More particularly, the present invention relates to a medium telephoto lens system that has a large aperture ratio i.e., high speed property and a comparatively wide viewing angle and which performs focusing by moving some of the lenses in the system.

The imaging lens system used in recent versions of SLR cameras is required to have not only high optical performance but also a large aperture ratio and ease and rapidity with which focusing can be performed.

High-performance medium telephoto lens systems having a large aperture ratio and a wide viewing angle are described in Unexamined Published Japanese Patent Application Nos. 48723/1984, 205625/1988, etc.

As an increasing number of modern cameras are provided with an autofocusing capability, "inner focus" and "rear focus" type lens systems have been developed to realize focusing by moving only some of the lenses in the lens system. For example, Unexamined Published Japanese Patent Application Nos. 154111/1989 and 154112/1989 proposed an "inner focus" version having a focusing lens group in a Gauss type objective, and Unexamined Published Japanese Patent Application No. 78208/1989 proposed a "rear focus" version in which the rear group of a Gauss type objective is moved for focusing.

However, if an "inner focus" system is incorporated in a telephoto lens having a large aperture ratio and a comparatively wide viewing angle, the need to provide a space for allowing the focusing lens group to move within the lens system increases the overall lens length. Furthermore, the lens diameter has to be increased in order to admit the necessary amount of marginal rays of light. As a result, the overall lens system becomes bulky.

In contrast, a "rear focus" version in which the rear group of a Gauss type objective is moved for focusing has the advantage of relative compactness but, on the other hand, it has been difficult to realize a high-performance system since substantial aberrational variations occur upon movement of the focusing group.

The present invention has been accomplished in order to solve the aforementioned problems of the prior art and its principal object is to provide a large aperture medium telephoto lens system that performs focusing by moving only the rear lens group, that is compact and that yet has high performance in that it experiences smaller amounts of aberrational variations as a result of focusing operation.

SUMMARY OF THE INVENTION

To achieve this object, the large aperture medium telephoto lens system of the present invention is composed of a front group $G_F$ that comprises, in order from the object side, at least two positive lens elements having a strong convex surface directed toward the object and a negative lens having a strong concave surface directed toward the image and which has a positive overall refractive power, and a rear group $G_R$ with a surface $S_{R1}$ which is the closest to the object being convex toward the object and which has a positive overall refractive power, with only the rear group $G_R$ being moved along the optical axis to perform focusing operations, and this lens system satisfies the following conditions:

$$0.5 < f/r_{R1} < 3.5 \quad (1)$$

$$0.6 < f_R/f < 1.1 \quad (2)$$

where
f: the focal length of the overall system;
$f_R$: the focal length of the rear group $G_R$; and
$r_{R1}$: the radius of curvature of $S_{R1}$ or the surface of the rear group $G_R$ which is the closest to the object.

It is more preferable that the lens system satisfies the following condition:

$$0.7 < f_R/f < 1.0 \quad (2')$$

In an embodiment of the present invention, the rear group $G_R$ comprises, in order from the object side, at least one positive lens element, a negative lens $L_{Rn}$ in which the surface on the image side is concave toward the image, and at least one positive lens element, and the lens system further satisfies the following condition:

$$0.8 < f/r_{R4} < 3.0 \quad (3)$$

where $r_{R4}$: the radius of curvature of the image-side surface of the negative lens $L_{Rn}$.

Such a lens system may be applicable to an overall system-moving type in which the front and rear groups are moved together for focusing. The overall system-moving type is preferably used for cameras other than automatic focusing cameras.

DESCRIPTION OF THE PREFERRED EMBODIMENTS

Figure 1:
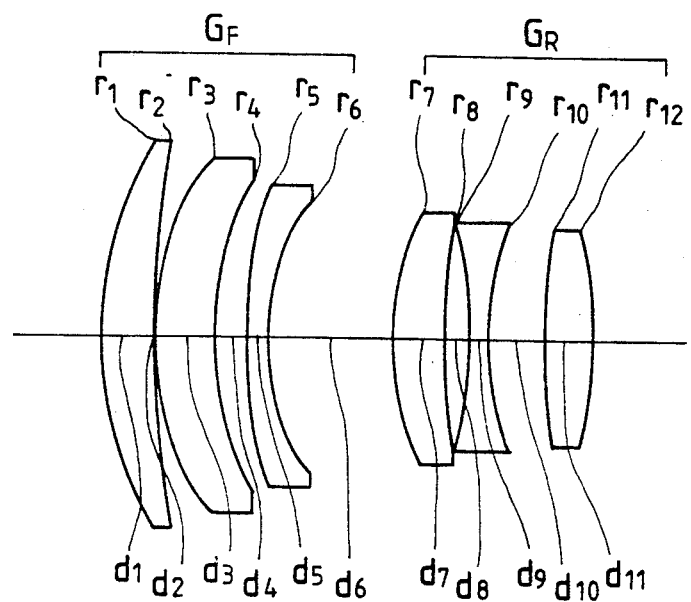
FIGS. 1, 3, 5, 7, 9 and 11 are simplified cross-sectional views of the lens systems constructed in Examples 1–6, respectively, of the present invention.
Figure 3:
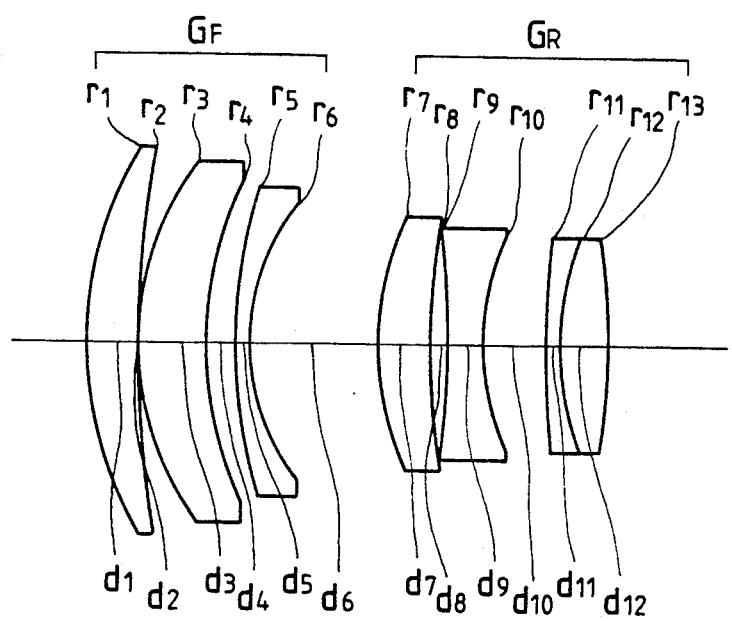
Figure 2A:
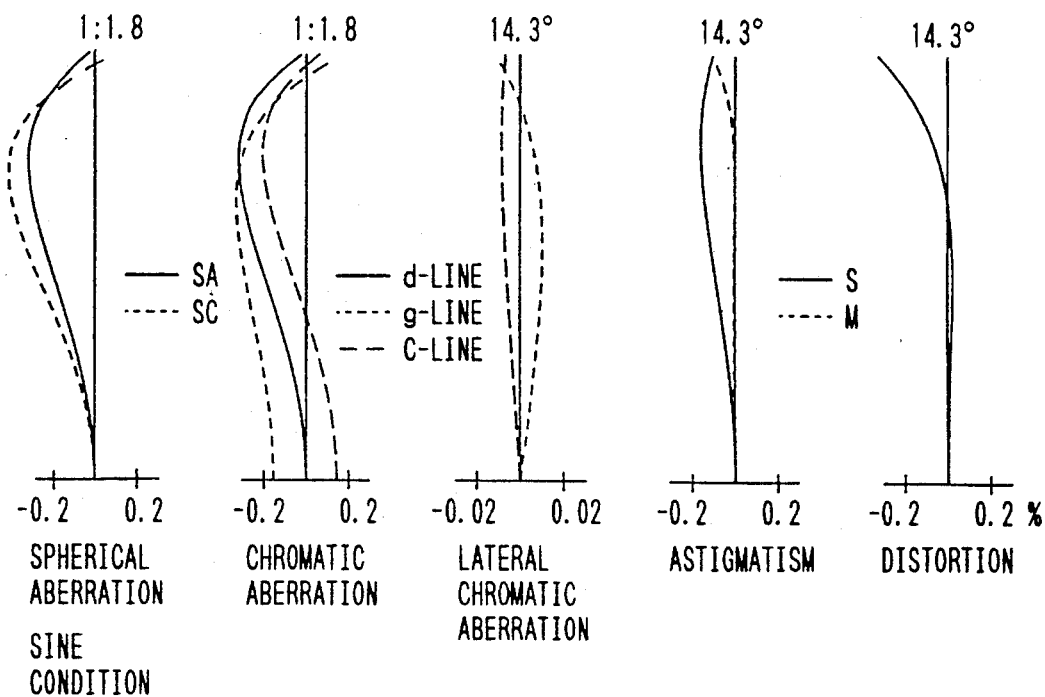
FIGS. 2, 4, 6, 8, 10 and 12 are graphs plotting the aberration curves obtained with the lens systems of Examples 1–6, respectively, with (A) referring to the case where the lens system is focused at infinity and (B) to the case for an image magnification of 1/10.
Figure 2B:
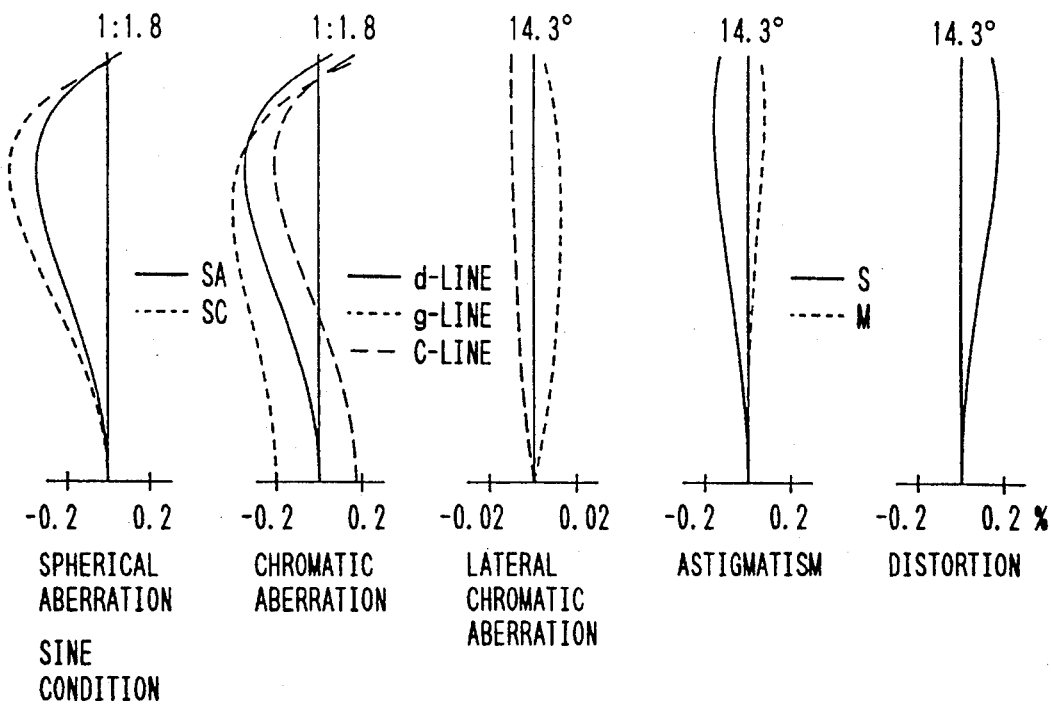
Figure 4A:
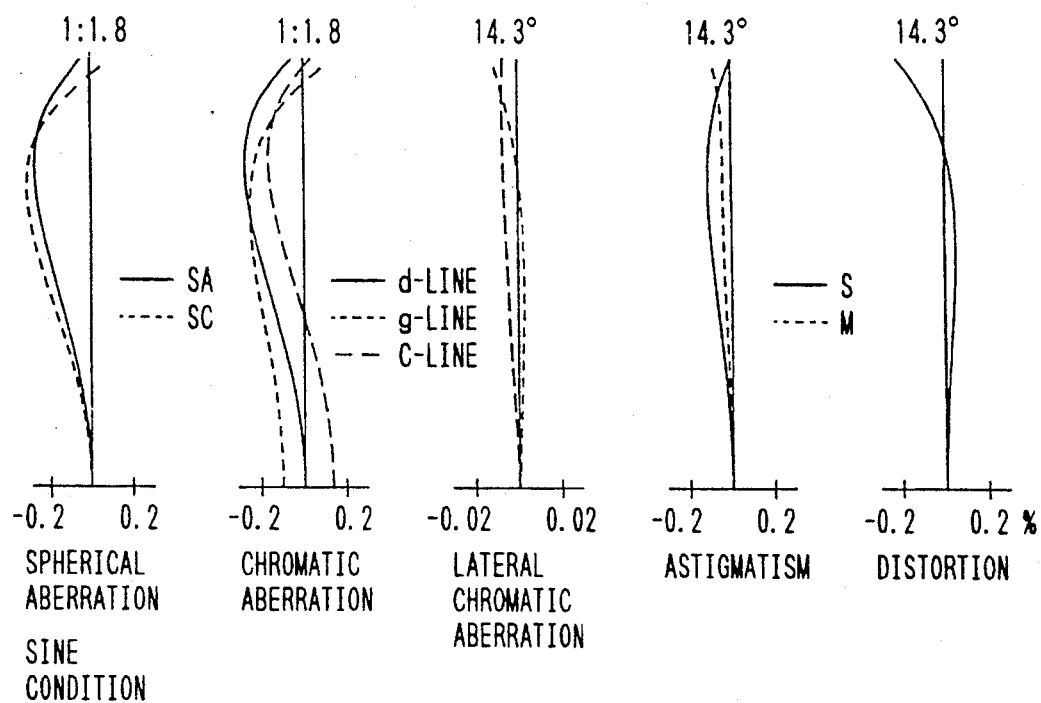
Figure 4B:
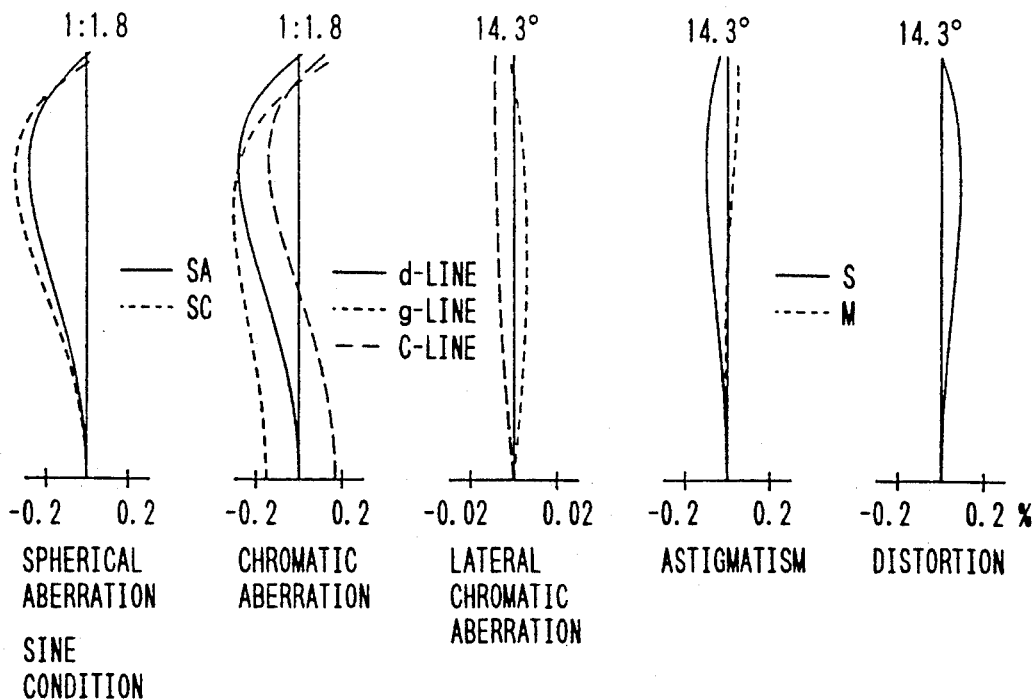
Figure 5:
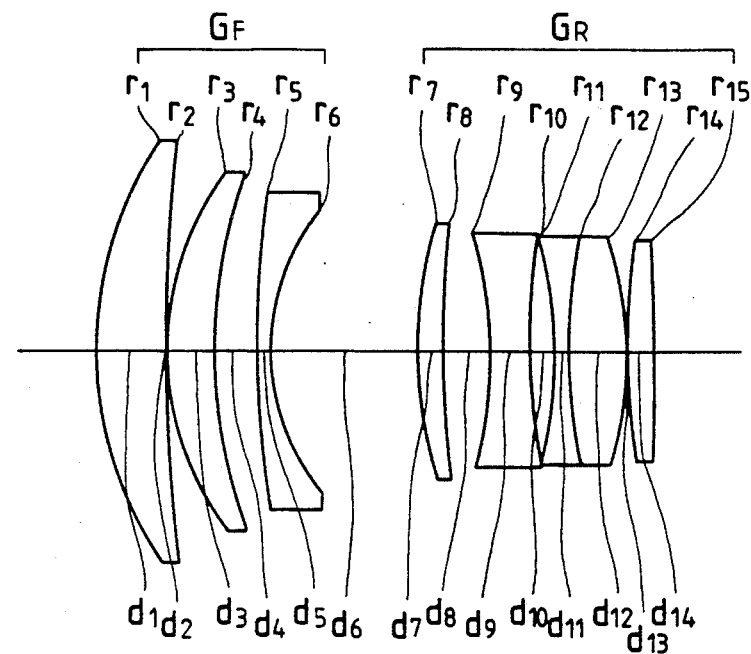
Figure 7:
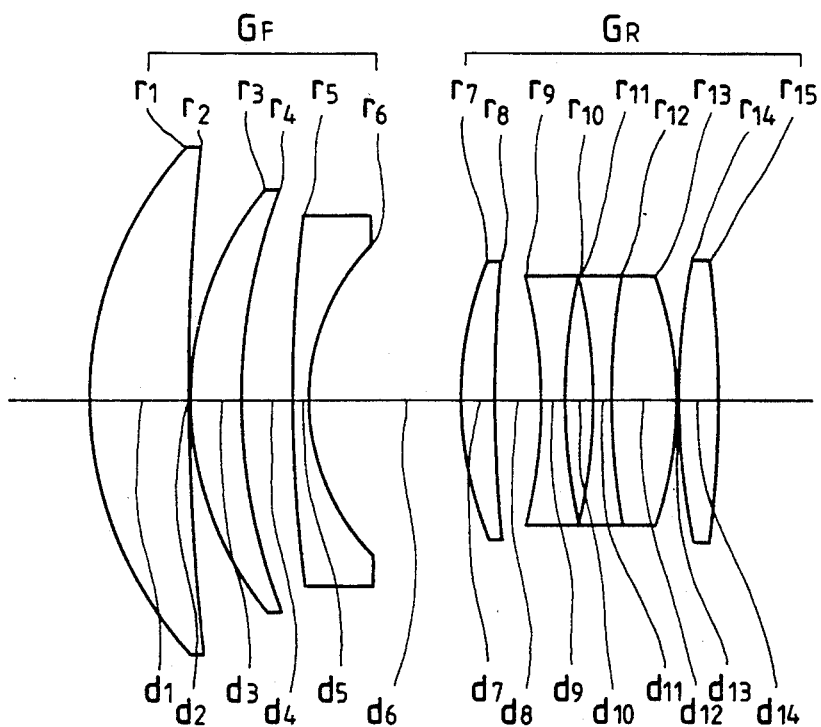
Figure 6A:
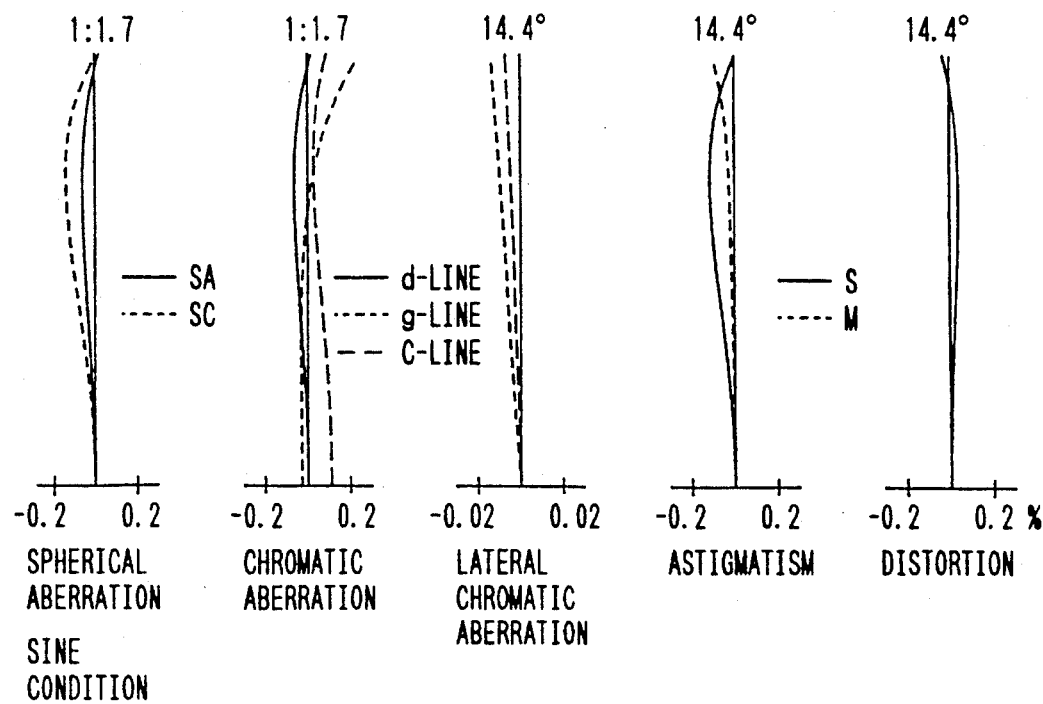
Figure 6B:
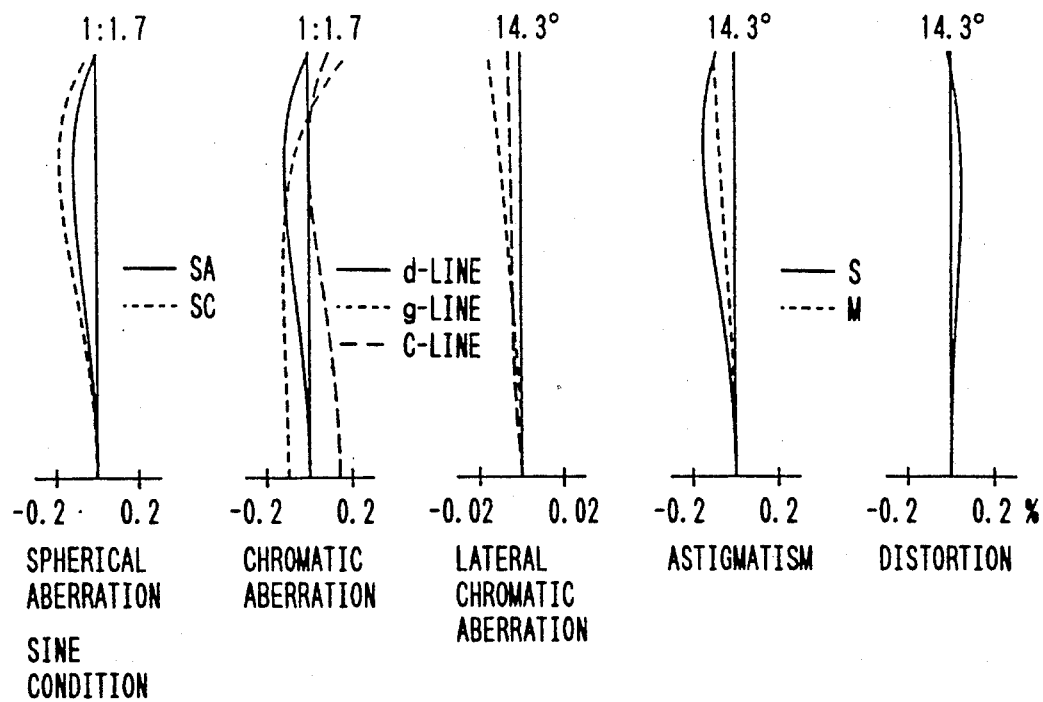
Figure 8A:
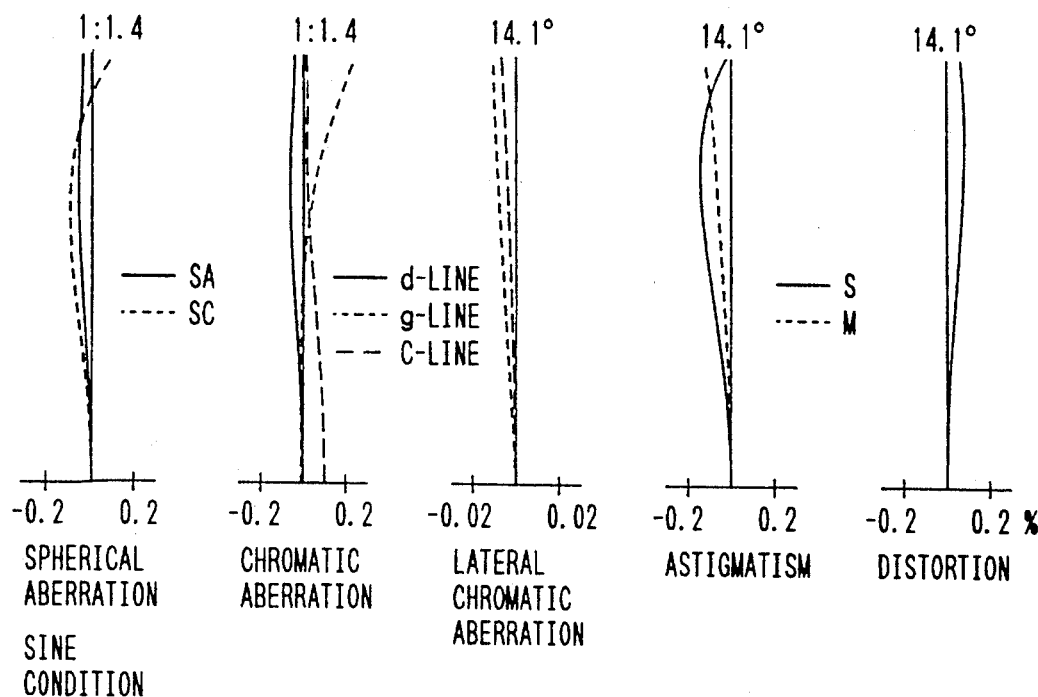
Figure 8B:
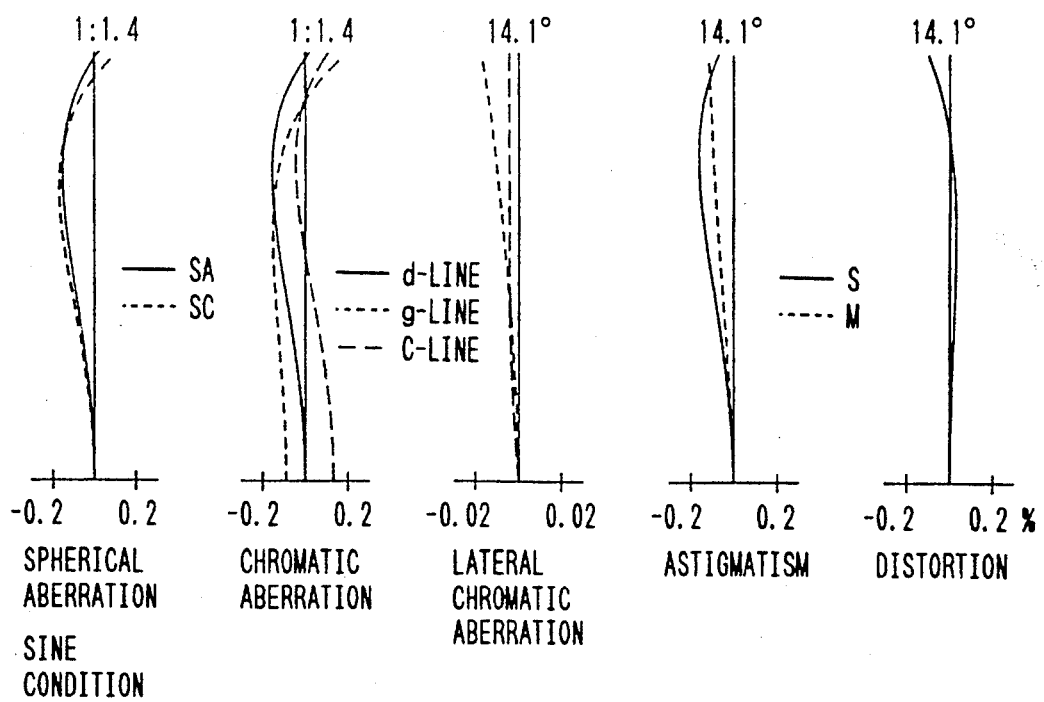
Figure 9:
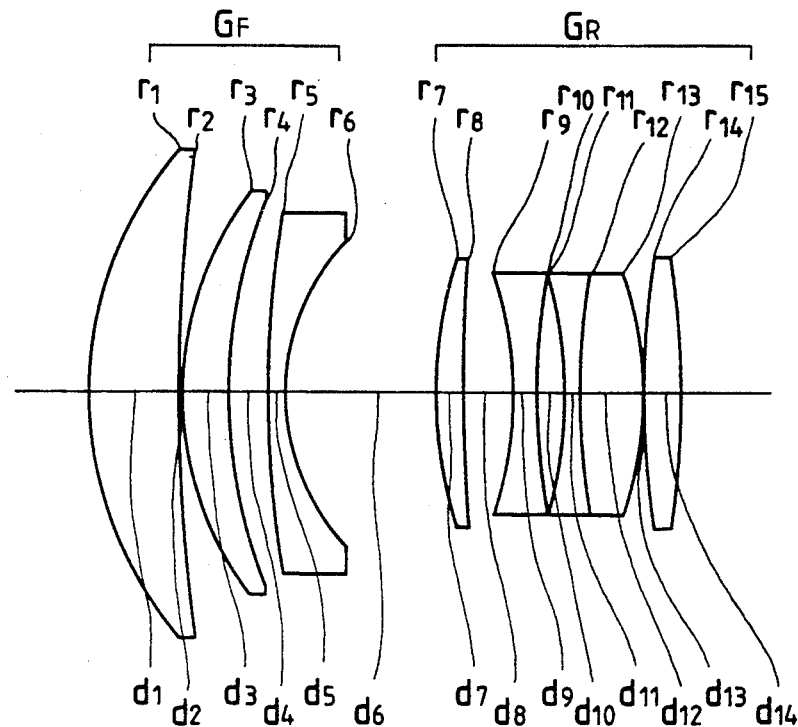
Figure 11:
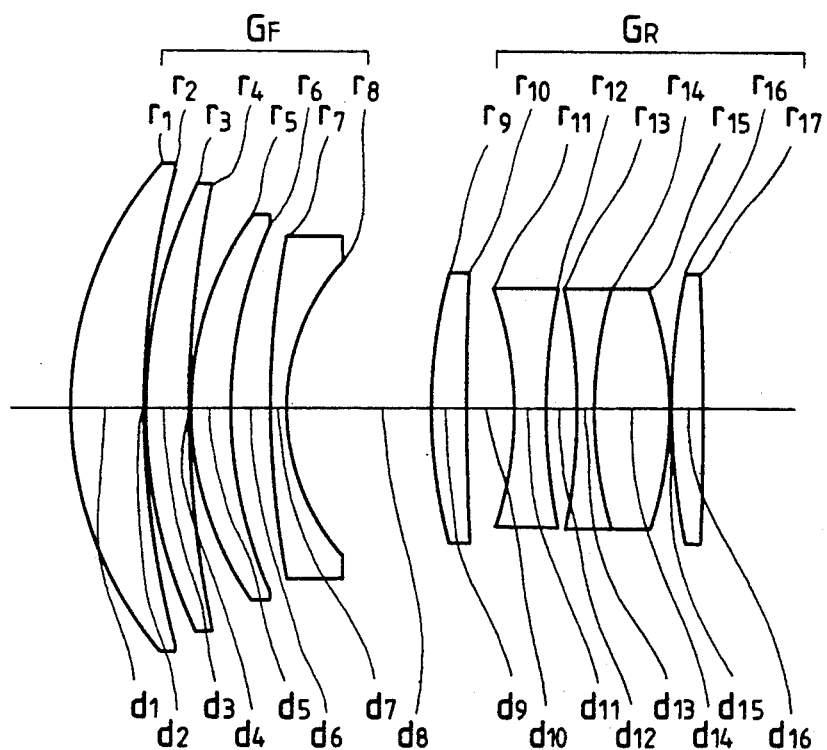
Figure 10A:
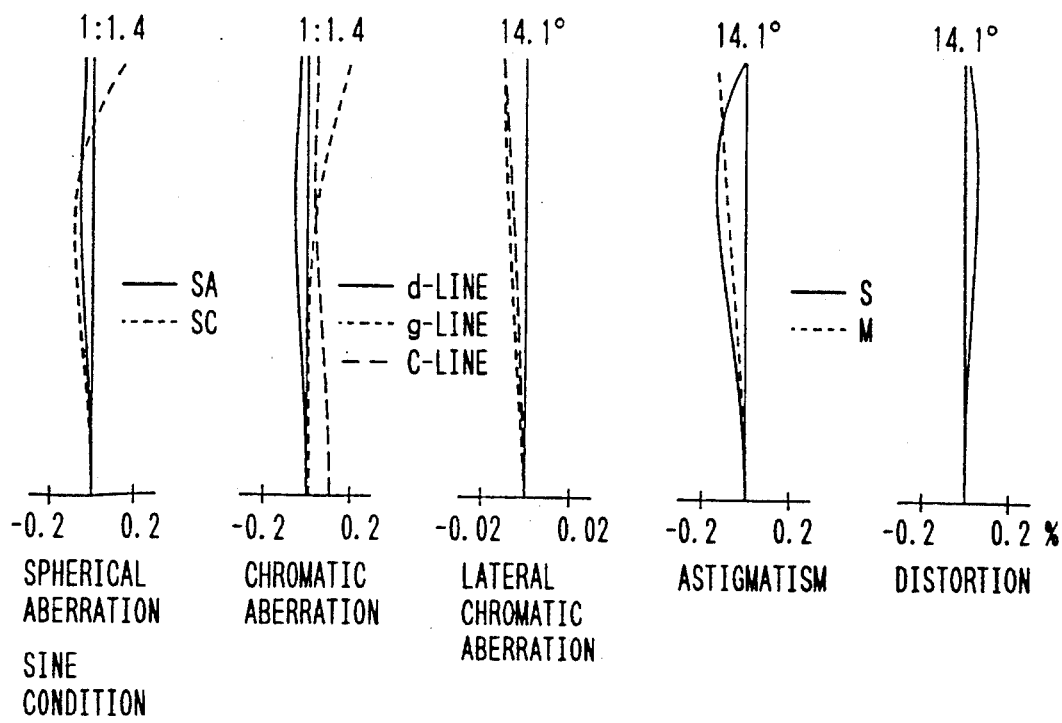
Figure 10B:
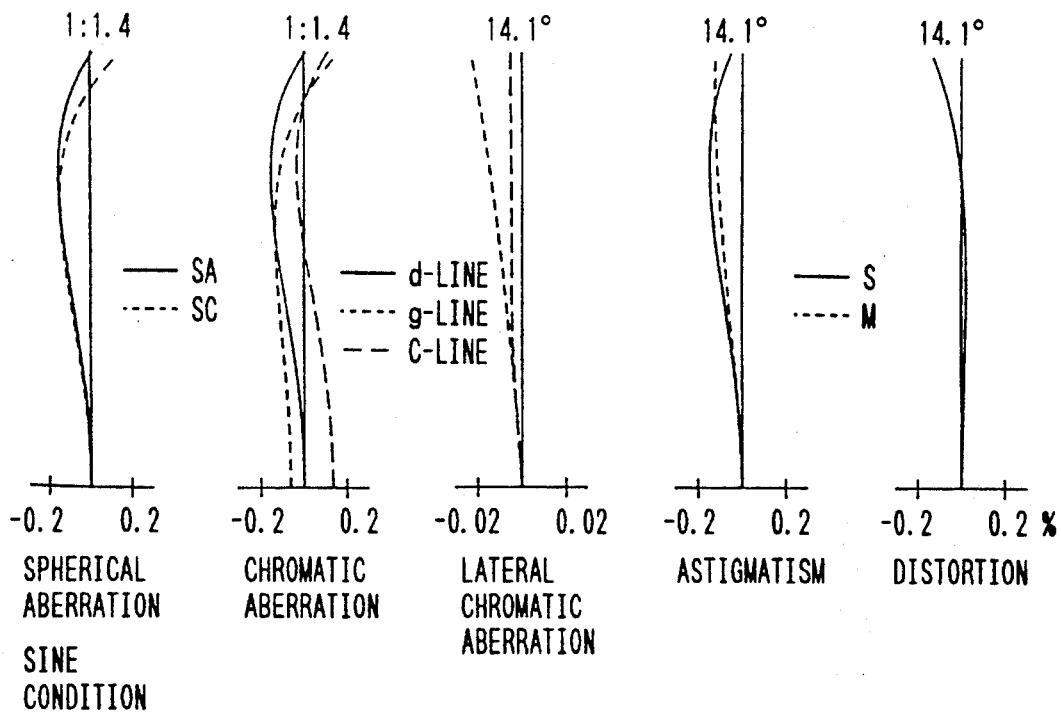
Figure 12A:
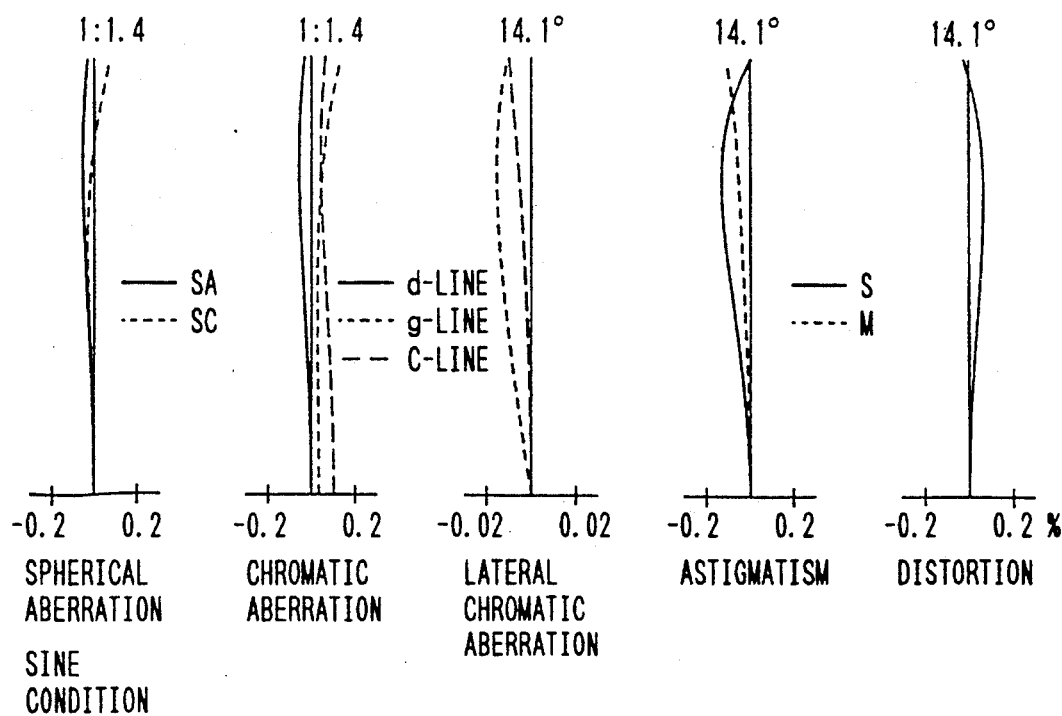
Figure 12B:
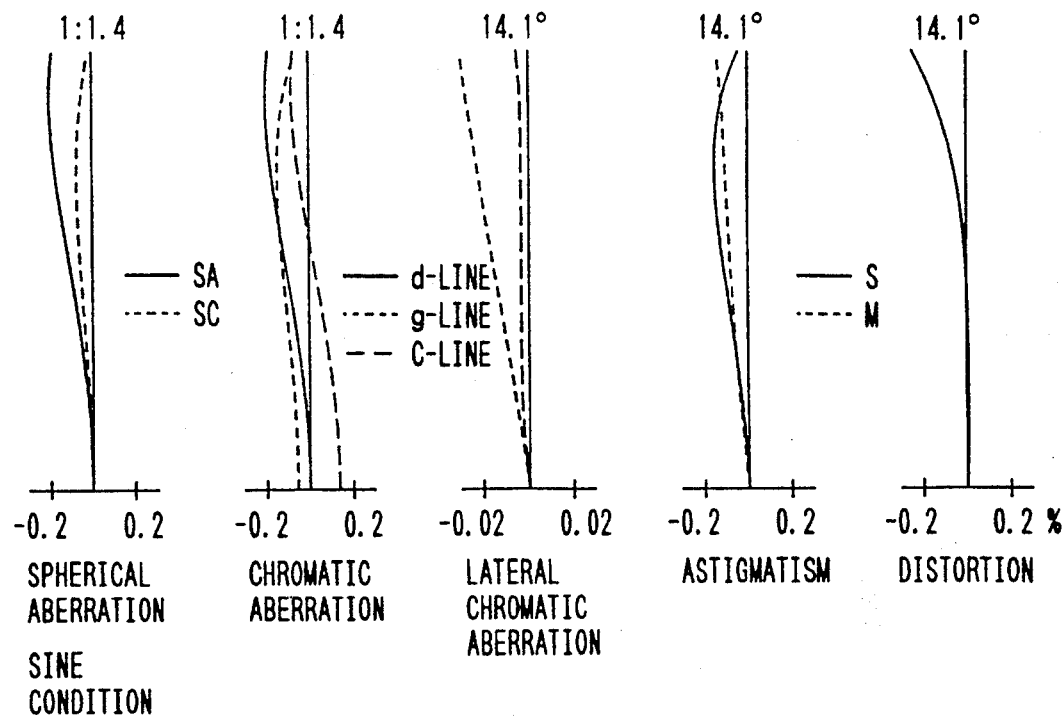
Figure 13:
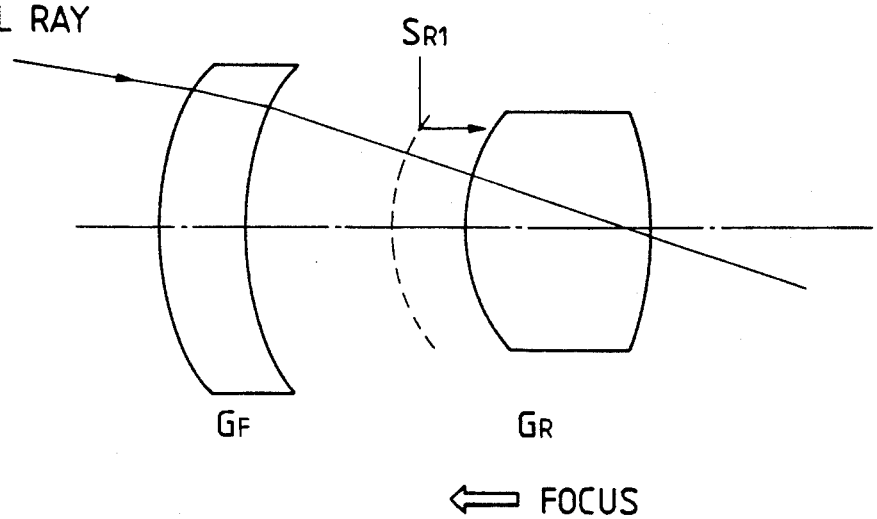
FIG. 13 is a simple schematic view showing the basic construction of the lens system of the present invention.

FIG. 13 is a simple schematic view showing the basic construction of the lens system of the present invention. The major feature of this system is that the surface $S_{R1}$ which is the closest to the object of all the surfaces of the rear group $G_R$ which is moved to effect focusing (this surface of the rear group which is the closest to the object is hereinafter abbreviated as $S_{R1}$) is convex toward the object.

Figure 14:
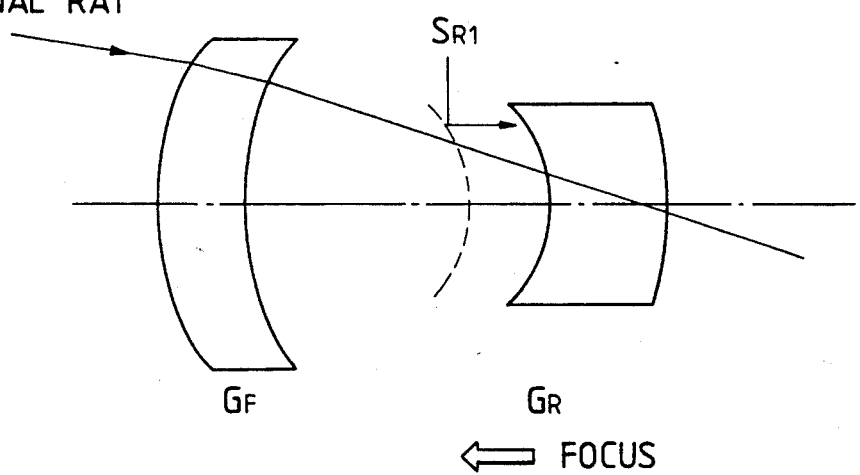
FIG. 14 is a simple schematic view showing the basic construction of a known Gaussian lens system.

In contrast, $S_{R1}$ of a conventional Gauss type objective in which the rear group $G_R$ is moved for focusing is characterized by being concave toward the object as shown in FIG. 14. In other words, the compositional feature of the conventional Gauss type objective is to achieve good performance by cancelling the aberrations developed in the front and rear groups which are arranged in a symmetrical configuration. However, if the rear group in the Gauss type objective is moved to effect focusing, the symmetricity of the front and rear groups will be upset to cause aberrational variations. In particular, the height at which an extra-axial marginal ray of light intercepts $S_{R1}$ will change as a result of the focusing movement of the rear group $G_R$ as shown in FIG. 14. In other words, the angle the extra-axial marginal ray makes with the line normal to $S_{R1}$ which is concave toward the object will change greatly upon movement of $G_R$ to thereby cause substantial aberrational variations. If the lens system is focused from infinity to a near distance, the extra-axial marginal ray will cause inward coma.

In the lens system of the present invention, $S_{R1}$ is designed to be convex toward the object, so that as shown in FIG. 13, the angle an extra-axial marginal ray makes with the line normal to $S_{R1}$ is small as shown in FIG. 13. Thus, even if the rear group $G_R$ is moved to effect focusing, with the resulting change in the height at which the extra-axial marginal ray intercepts $S_{R1}$, the change in the angle this ray makes with the line normal to $S_{R1}$ is sufficiently small to reduce the aberrational variations that may occur as a result of focusing operations.

Condition (1) shows the appropriate radius of curvature to be imparted to $S_{R1}$. If $r_{R1}$, or the radius of curvature of $S_{R1}$, is extremely small, the angle an extra-axial marginal ray makes with the line normal to $S_{R1}$ will change greatly when the rear group $G_R$ is moved for focusing, with the resulting change in the height of the ray intercept and, thus, great aberrational variation will occur even if $S_{R1}$ is convex toward the object. If the lens system is focused from infinity to a near distance, the extra-axial marginal ray will produce outward coma. Accordingly, from the viewpoint of aberrational variations, $r_{R1}$ must not be reduced to such an extent that the upper limit of condition (1) is exceeded.

If, on the other hand, $r_{R1}$ or the radius of curvature of $S_{R1}$ is increased to such an extent that $S_{R1}$ becomes almost flat, the aberrational variations that occur as a result of focusing can be reduced. However, as dictated by condition (2) or (2') which will be discussed hereinafter, the rear group $G_R$ is required to have reasonably strong positive refractive power. If $r_{R1}$ alone is increased so that the necessary positive refractive power is provided by the positive surfaces other than $S_{R1}$, aberrations cannot be compensated in a balanced way and the chance of the development of a negative spherical aberration will increase. Further, in order to insure the space necessary for permitting the rear group $G_R$ to move in the lens system to achieve focusing, the rear group itself must be compact. Accordingly, $S_{R1}$ desirably has a strong positive refractive power. Hence, from the viewpoints of aberrational compensation and compactness of the rear group $G_R$, $r_{R1}$ must not be increased to such an extent that the lower limit of condition (1) cannot be reached.

Conditions (2) and (2') describe the requirement that must be met by the positive refractive power of the rear group $G_R$. Since the rear group $G_R$ is moved in the lens system to achieve focusing, the lens system must be provided with the space necessary for moving the rear group $G_R$. If $f_R$ or the focal length of the rear group $G_R$ is increased to such an extent that the upper limit of condition (2) or (2') is exceeded, the mechanical restraints of the limited space for movement make it impossible to reduce the nearest distance from the object. Further, providing a larger space for the movement of the rear group $G_R$ with a view to reducing the nearest distance from the object will result in a bulky lens system. Hence, from the viewpoints of the nearest distance from the object and the compactness of the overall lens system, $f_R$ or the focal length of the rear group $G_R$ must not be increased to such an extent that the upper limit of condition (2) or (2') is exceeded.

Reducing $f_R$ to such an extent that the lower limit of condition (2) or (2') is not reached is favorable for the purposes of shortening the nearest distance from the object and reducing the overall size of the lens system. However, a certain length of back focus must be insured for lens systems of the kind contemplated by the present invention which are to be used in SLR cameras. Thus, in order to insure the necessary back focus, the focal distance of the rear group $G_R$ must also be reasonably long. Accordingly, it is not desirable to reduce the $f_R$ to such an extent that the lower limit of condition (2) or (2') is not reached.

It is also desirable that the rear group $G_R$, combined with the front group $G_F$, have a construction that satisfies the conditions (1) and (2) or (2') and which permit aberrations to be compensated in an efficient and balanced way. To meet this need, it is desirable for the purpose of the present invention that the rear group $G_R$ has a configuration of triplet type or modifications thereof and that it also satisfies condition (3) in order to achieve even better performance. Even if $r_{R1}$ satisfies condition (1), a positive refractive power will result to produce a negative spherical aberration. It is therefore necessary that the rear group $G_R$ be provided with a surface that compensates for that negative spherical aberration to maintain the high performance of $G_R$. This necessity is expressed mathematically by condition (3). If $r_{R4}$ is increased to such an extent that the lower limit of this condition is not reached, the negative spherical aberration produced by $S_{R1}$ will partly remain uncompensated. If, on the other hand, $r_{R4}$ is reduced to such an extent that the upper limit of condition (3) is exceeded, higher-order spherical aberrations will develop and this is also undesirable.

EXAMPLES

Examples 1-6 of the present invention are described below with reference to data sheets, in which:
f: the focal length of the overall system;
$F_{NO}$: the aperture ratio or F-number;
ω: half view angle;
r: the radius of curvature of an individual lens surface;
d: the thickness of an individual lens or the aerial distance between adjacent lenses;
n: the refractive index of an individual lens at the d-line;
ν: the Abbe number of an individual lens; and
$f_B$: back focus.

| Example 1 | | | | |
|---|---|---|---|---|
| F No = 1:1.8 | | f = 100.0 | ω = 14.3° | |
| No | r | d | n | ν |
| 1 | 53.523 | 7.30 | 1.69680 | 55.5 |
| 2 | 152.039 | 0.18 | | |
| 3 | 40.942 | 8.79 | 1.77250 | 49.6 |
| 4 | 51.223 | 4.38 | | |
| 5 | 74.403 | 2.11 | 1.71736 | 29.5 |
| 6 | 29.884 | variable | | |
| 7 | 39.084 | 7.13 | 1.77250 | 49.6 |

-continued

| | | | | |
|---|---|---|---|---|
| 8 | 89.132 | 3.12 | | |
| 9 | −87.130 | 2.98 | 1.68893 | 31.1 |
| 10 | 41.858 | 7.58 | | |
| 11 | 88.669 | 6.75 | 1.80610 | 40.9 |
| 12 | −68.007 | | | |

| | At infinity | At image magnification of 1/10 |
|---|---|---|
| $d_6$ | 18.09 | 6.69 |
| $f_B$ | 52.36 | 63.76 |

$r_{R1} = r_7 = 39.084$
$f_R = 97.15$
$r_{R4} = r_{10} = 41.858$

Example 2

F No = 1:1.8   f = 100.0   ω = 14.3°

| No | r | d | n | ν |
|---|---|---|---|---|
| 1 | 55.558 | 6.78 | 1.69680 | 55.5 |
| 2 | 141.167 | 0.18 | | |
| 3 | 43.158 | 9.60 | 1.77250 | 49.6 |
| 4 | 54.420 | 3.75 | | |
| 5 | 68.388 | 2.11 | 1.72825 | 28.5 |
| 6 | 31.079 | variable | | |
| 7 | 39.848 | 7.59 | 1.77250 | 49.6 |
| 8 | 105.369 | 2.65 | | |
| 9 | −114.402 | 4.70 | 1.64769 | 33.8 |
| 10 | 37.269 | 8.74 | | |
| 11 | 140.743 | 1.76 | 1.69895 | 30.1 |
| 12 | 36.297 | 7.13 | 1.83400 | 37.2 |
| 13 | −82.064 | | | |

| | At infinity | At image magnification of 1/10 |
|---|---|---|
| $d_6$ | 17.98 | 6.60 |
| fB | 50.65 | 62.03 |

$r_{R1} = r_7 = 39.848$
$f_R = .98.59$
$r_{R4} = r_{10} = 37.269$

Example 3

F No = 1:1.7   f = 100.0   ω = 14.4°

| No | r | d | n | ν |
|---|---|---|---|---|
| 1 | 55.492 | 9.55 | 1.69680 | 55.5 |
| 2 | 272.701 | 0 18 | | |
| 3 | 43.272 | 6.22 | 1.61800 | 63.4 |
| 4 | 69.167 | 5.86 | | |
| 5 | 134.352 | 2.37 | 1.67270 | 32.1 |
| 6 | 31.963 | variable | | |
| 7 | 55.743 | 3.85 | 1.77250 | 49.6 |
| 8 | 149.341 | 6.54 | | |
| 9 | −64.353 | 5.40 | 1.68893 | 31.1 |
| 10 | 69.176 | 3.63 | | |
| 11 | −72.361 | 2.13 | 1.64769 | 33.8 |
| 12 | 67.813 | 8.28 | 1.83400 | 37.2 |
| 13 | −53.030 | 0.12 | | |
| 14 | 86.312 | 3.90 | 1.78590 | 44.2 |
| 15 | −1007.015 | | | |

| | At infinity | At image magnification of 1/10 |
|---|---|---|
| $d_6$ | 20.45 | 8.65 |
| $f_B$ | 51.69 | 63.49 |

$r_{R1} = r_7 = 55.743$
$f_R = 91.50$
$r_{R4} = r_{10} = 69.176$

Example 4

F No = 1:1.4   f = 100.0   ω = 14.1°

| No | r | d | n | ν |
|---|---|---|---|---|
| 1 | 55.159 | 13.94 | 1.61800 | 63.4 |
| 2 | 353.958 | 0.17 | | |
| 3 | 47.367 | 7.04 | 1.77250 | 49.6 |
| 4 | 79.655 | 7.20 | | |
| 5 | 193.855 | 2.33 | 1.69895 | 30.1 |
| 6 | 31.607 | variable | | |
| 7 | 57.371 | 4.61 | 1.77250 | 49.6 |
| 8 | 245.363 | 6.76 | | |
| 9 | −61.317 | 3.19 | 1.66680 | 33.0 |
| 10 | 74.188 | 4.33 | | |
| 11 | −65.690 | 2.33 | 1.67270 | 32.1 |
| 12 | 101.428 | 9.28 | 1.83400 | 37.2 |
| 13 | −57.545 | 0.12 | | |
| 14 | 98.095 | 5.64 | 1.78590 | 44.2 |
| 15 | −160.255 | | | |

| | At infinity | At image magnification of 1/10 |
|---|---|---|
| $d_6$ | 21.61 | 10.12 |
| $f_B$ | 44.19 | 55.68 |

$r_{R1} = r_7 = 57.371$
$f_R = 78.74$
$r_{R4} = r_{10} = 74.188$

Example 5

F No = 1:1.4   f = 100.0   ω = 14.1°

| No | r | d | n | ν |
|---|---|---|---|---|
| 1 | 55.480 | 13.15 | 1.72916 | 54.7 |
| 2 | 246.706 | 0.28 | | |
| 3 | 46.202 | 7.38 | 1.72916 | 54.7 |
| 4 | 74.871 | 5.88 | | |
| 5 | 163.183 | 2.33 | 1.71736 | 29.5 |
| 6 | 30.896 | variable | | |
| 7 | 60.755 | 4.56 | 1.77250 | 49.6 |
| 8 | 290.947 | 6.94 | | |
| 9 | −59.387 | 3.77 | 1.68893 | 31.1 |
| 10 | 80.601 | 4.04 | | |
| 11 | −69.419 | 2.33 | 1.67270 | 32.1 |
| 12 | 94.667 | 9.31 | 1.83400 | 37.2 |
| 13 | −60.204 | 0.12 | | |
| 14 | 110.139 | 5.69 | 1.80610 | 40.9 |
| 15 | −133.433 | | | |

| | At infinity | At image magnification of 1/10 |
|---|---|---|
| $d_6$ | 22.31 | 10.69 |
| $f_B$ | 44.22 | 55.84 |

$r_{R1} = r_7 = 60.755$
$f_R = 79.26$
$r_{R4} = r_{10} = 80.601$

Example 6

F No = 1:1.4   f = 100.0   ω = 14.1°

| No | r | d | n | ν |
|---|---|---|---|---|
| 1 | 59.318 | 10.33 | 1.75700 | 47.9 |
| 2 | 142.770 | 0.23 | | |
| 3 | 77.863 | 6.05 | 1.69350 | 53.2 |
| 4 | 150.243 | 0.48 | | |
| 5 | 49.552 | 6.08 | 1.69350 | 53.2 |
| 6 | 65.025 | 6.11 | | |
| 7 | 152.087 | 2.33 | 1.78470 | 26.2 |
| 8 | 33.363 | variable | | |
| 9 | 71.275 | 5.66 | 1.77250 | 49.6 |
| 10 | 11461.308 | 6.94 | | |
| 11 | −50.130 | 4.55 | 1.67270 | 32.1 |
| 12 | 82.006 | 4.52 | | |
| 13 | −92.026 | 2.33 | 1.67270 | 32.1 |
| 14 | 55.236 | 11.45 | 1.83400 | 37.2 |
| 15 | −52.841 | 0.12 | | |
| 16 | 95.443 | 4.74 | 1.80610 | 40.9 |
| 17 | −785.494 | | | |

| | At infinity | At image magnification of 1/10 |
|---|---|---|
| $d_6$ | 21.10 | 9.95 |
| $f_B$ | 44.07 | 55.22 |

$r_{R1} = r_7 = 71.275$
$f_R = 74.17$
$r_{R4} = r_{10} = 82.006$

As described on the foregoing pages, the large aperture medium telephoto lens system of the present invention which is of a "rear focus" type in which only the rear group $G_R$ is moved to perform focusing is constructed in such a way as to satisfy both conditions (1) and (2), and optionally condition (3), and this insures that the overall lens system is compact and that it exhibits high performance without experiencing undesirable great aberrational variations as a result of focusing operations. As is clear from the accompanying FIGS. 2, 4, 6, 8, 10 and 12, this lens system performs satisfactorily irrespective of whether it is focused at infinity (see each of those figures under A) or at a near distance from the object (see under B).

I claim:

1. A large aperture, medium telephoto lens system which is composed of a front group $G_F$ and a rear group $G_R$, said front group comprising, in order from the object side, at least two positive lens elements having a strong convex surface directed toward the object and a negative lens having a strong concave surface directed toward the image and which has a positive overall refractive power, and said rear group $G_R$ having a positive overall refractive power and having at least first and second lens elements numbered from the object side, with the first lens element having a surface $S_{R1}$ which is the closest to the object being convex toward the object, with only the rear group $G_R$ being moved along the optical axis to perform focusing operations, which lens system satisfies the following condition:

$$0.5 < f/r_{R1} < 3.5 \qquad (1)$$

where f: the focal length of the overall system; and
$r_{R1}$: the radius of curvature of $S_{R1}$.

2. The lens system according to claim 1, further satisfying the following condition:

$$0.6 < f_R/f < 1.1 \qquad (2)$$

where $f_R$: the focal length of the rear group $G_R$.

3. The lens system according to claim 1 wherein the rear group $G_R$ comprises, in order from the object side, at least one positive lens element, a negative lens $L_{Rn}$ in which the surface on the image side is concave toward the image, and at least one positive lens element, which lens system further satisfies the following condition:

$$0.8 < f/r_{R4} < 3.0 \qquad (3)$$

where $r_{R4}$: the radius of curvature of the image-side surface of the negative lens $L_{Rn}$.

4. The lens system according to claim 3, further satisfying the following chart:

| F No = 1:1.8 | | f = 100.0 | | ω = 14.3° |
|---|---|---|---|---|
| No | r | d | n | ν |
| 1 | 53.523 | 7.30 | 1.69680 | 55.5 |
| 2 | 152.039 | 0.18 | | |
| 3 | 40.942 | 8.79 | 1.77250 | 49.6 |
| 4 | 51.223 | 4.38 | | |
| 5 | 74.403 | 2.11 | 1.71736 | 29.5 |
| 6 | 29.884 | variable | | |
| 7 | 39.084 | 7.13 | 1.77250 | 49.6 |
| 8 | 89.132 | 3.12 | | |
| 9 | −87.130 | 2.98 | 1.68893 | 31.1 |
| 10 | 41.858 | 7.58 | | |
| 11 | 88.669 | 6.75 | 1.80610 | 40.9 |
| 12 | −68.007 | | | |

| | At infinity | At image magnification of 1/10 |
|---|---|---|
| $d_6$ | 18.09 | 6.69 |
| $f_B$ | 52.36 | 63.76 |

$r_{R1} = r_7 = 39.084$
$f_R = 97.15$
$r_{R4} = r_{10} = 41.858$ where $F_{NO}$: the aperture ratio or F-number;
ω: half view angle;
r: the radius of curvature of an individual lens surface;
d: the thickness of an individual lens or the aerial distance between adjacent lenses;
n: the refractive index of an individual lens at the d-line;
ν: the Abbe number of an individual lens; and
$f_B$: back focus.

5. The lens system according to claim 3, further satisfying the following chart:

| F No = 1:1.8 | | f = 100.0 | | ω = 14.3° |
|---|---|---|---|---|
| No | r | d | n | ν |
| 1 | 55.558 | 6.78 | 1.69680 | 55.5 |
| 2 | 141.167 | 0.18 | | |
| 3 | 43.158 | 9.60 | 1.77250 | 49.6 |
| 4 | 54.420 | 3.75 | | |
| 5 | 68.388 | 2.11 | 1.72825 | 28.5 |
| 6 | 31.079 | variable | | |
| 7 | 39.848 | 7.59 | 1.77250 | 49.6 |
| 8 | 105.369 | 2.65 | | |
| 9 | −114.402 | 4.70 | 1.64769 | 33.8 |
| 10 | 37.269 | 8.74 | | |
| 11 | 140.743 | 1.76 | 1.69895 | 30.1 |
| 12 | 36.297 | 7.13 | 1.83400 | 37.2 |
| 13 | −82.064 | | | |

| | At infinity | At image magnification of 1/10 |
|---|---|---|
| $d_6$ | 17.98 | 6.60 |
| $f_B$ | 50.65 | 62.03 |

$r_{R1} = r_7 = 39.848$
$f_R = 98.59$
$r_{R4} = r_{10} = 37.269$ where $F_{NO}$: the aperture ratio or F-number;
ω: half view angle;
r: the radius of curvature of an individual lens surface;
d: the thickness of an individual lens or the aerial distance between adjacent lenses;
n: the refractive index of an individual lens at the d-line;
ν: the Abbe number of an individual lens; and
$f_B$: back focus.

6. The lens system according to claim 3 further satisfying the following chart:

| F No = 1:1.7 | | f = 100.0 | | ω = 14.4° |
|---|---|---|---|---|
| No | r | d | n | ν |
| 1 | 55.492 | 9.55 | 1.69680 | 55.5 |
| 2 | 272.701 | 0.18 | | |
| 3 | 43.272 | 6.22 | 1.61800 | 63.4 |
| 4 | 69.167 | 5.86 | | |
| 5 | 134.352 | 2.37 | 1.67270 | 32.1 |
| 6 | 31.963 | variable | | |
| 7 | 55.743 | 3.85 | 1.77250 | 49.6 |
| 8 | 149.341 | 6.54 | | |
| 9 | −64.353 | 5.40 | 1.68893 | 31.1 |
| 10 | 69.176 | 3.63 | | |
| 11 | −72.361 | 2.13 | 1.64769 | 33.8 |
| 12 | 67.813 | 8.28 | 1.83400 | 37.2 |
| 13 | −53.030 | 0.12 | | |
| 14 | 86.312 | 3.90 | 1.78590 | 44.2 |
| 15 | −1007.015 | | | |

| | At infinity | At image magnification of 1/10 |
|---|---|---|
| $d_6$ | 20.45 | 8.65 |
| $f_B$ | 51.69 | 63.49 |

$r_{R1} = r_7 = 55.743$
$f_R = 91.50$
$r_{R4} = r_{10} = 69.176$ where $F_{NO}$: the aperture ratio or F-number;
ω: half view angle;
r: the radius of curvature of an individual lens surface;
d: the thickness of an individual lens or the aerial distance between adjacent lenses;
n: the refractive index of an individual lens at the d-line;

$\nu$: the Abbe number of an individual lens; and
$f_B$: back focus.

7. The lens system according to claim 3, further satisfying the following chart:

| F No = 1:1.4 | | f = 100.0 | $\omega$ = 14.1° | |
|---|---|---|---|---|
| No | r | d | n | $\nu$ |
| 1 | 55.159 | 13.94 | 1.61800 | 63.4 |
| 2 | 353.958 | 0.17 | | |
| 3 | 47.367 | 7.04 | 1.77250 | 49.6 |
| 4 | 79.655 | 7.20 | | |
| 5 | 193.855 | 2.33 | 1.69895 | 30.1 |
| 6 | 31.607 | variable | | |
| 7 | 57.371 | 4.61 | 1.77250 | 49.6 |
| 8 | 245.363 | 6.76 | | |
| 9 | −61.317 | 3.19 | 1.66680 | 33.0 |
| 10 | 74.188 | 4.33 | | |
| 11 | −65.690 | 2.33 | 1.67270 | 32.1 |
| 12 | 101.428 | 9.28 | 1.83400 | 37.2 |
| 13 | −57.545 | 0.12 | | |
| 14 | 98.095 | 5.64 | 1.78590 | 44.2 |
| 15 | −160.255 | | | |

| | At infinity | At image magnification of 1/10 |
|---|---|---|
| $d_6$ | 21.61 | 10.12 |
| $f_B$ | 44.19 | 55.68 |

$r_{R1} = r_7 = 57.371$
$f_R = 78.74$
$r_{R4} = r_{10} = 74.188$ where $F_{NO}$: the aperture ratio or F-number;
$\omega$: half view angle;
r: the radius of curvature of an individual lens surface;
d: the thickness of an individual lens or the aerial distance between adjacent lenses:
n: the refractive index of an individual lens at the d-line;
$\nu$: the Abbe number of an individual lens; and
$f_B$: back focus.

8. The lens system according to claim 3, further satisfying the following chart:

| F No = 1:1.4 | | f = 100.0 | $\omega$ = 14.1° | |
|---|---|---|---|---|
| No | r | d | n | $\nu$ |
| 1 | 55.480 | 13.15 | 1.72916 | 54.7 |
| 2 | 246.706 | 0.28 | | |
| 3 | 46.202 | 7.38 | 1.72916 | 54.7 |
| 4 | 74.871 | 5.88 | | |
| 5 | 163.183 | 2.33 | 1.71736 | 29.5 |
| 6 | 30.896 | variable | | |
| 7 | 60.755 | 4.56 | 1.77250 | 49.6 |
| 8 | 290.947 | 6.94 | | |
| 9 | −59.387 | 3.77 | 1.68893 | 31.1 |
| 10 | 80.601 | 4.04 | | |
| 11 | −69.419 | 2.33 | 1.67270 | 32.1 |
| 12 | 94.667 | 9.31 | 1.83400 | 37.2 |
| 13 | −60.204 | 0.12 | | |
| 14 | 110.139 | 5.69 | 1.80610 | 40.9 |
| 15 | −133.433 | | | |

| | At infinity | At image magnification of 1/10 |
|---|---|---|
| $d_6$ | 22.31 | 10.69 |
| $f_B$ | 44.22 | 55.84 |

$r_{R1} = r_7 = 60.755$
$f_R = 79.26$
$r_{R4} = r_{10} = 80.601$ where $F_{NO}$: the aperture ratio or F-number;
$\omega$: half view angle;
r: the radius of curvature of an individual lens surface;
d: the thickness of an individual lens or the aerial distance between adjacent lenses:
n: the refractive index of an individual lens at the d-line;
$\nu$: the Abbe number of an individual lens; and
$f_B$: back focus.

9. The lens system according to claim 3, further satisfying the following chart:

| F No = 1:1.4 | | f = 100.0 | $\omega$ = 14.1° | |
|---|---|---|---|---|
| No | r | d | n | $\nu$ |
| 1 | 59.318 | 10.33 | 1.75700 | 47.9 |
| 2 | 142.770 | 0.23 | | |
| 3 | 77.863 | 6.05 | 1.69350 | 53.2 |
| 4 | 150.243 | 0.48 | | |
| 5 | 49.552 | 6.08 | 1.69350 | 53.2 |
| 6 | 65.025 | 6.11 | | |
| 7 | 152.087 | 2.33 | 1.78470 | 26.2 |
| 8 | 33.363 | variable | | |
| 9 | 71.275 | 5.66 | 1.77250 | 49.6 |
| 10 | 11461.308 | 6.94 | | |
| 11 | −50.130 | 4.55 | 1.67270 | 32.1 |
| 12 | 82.006 | 4.52 | | |
| 13 | −92.026 | 2.33 | 1.67270 | 32.1 |
| 14 | 355.236 | 11.45 | 1.83400 | 37.2 |
| 15 | −52.841 | 0.12 | | |
| 16 | 95.443 | 4.74 | 1.80610 | 40.9 |
| 17 | −785.494 | | | |

| | At infinity | At image magnification of 1/10 |
|---|---|---|
| $d_6$ | 21.10 | 9.95 |
| $f_B$ | 44.07 | 55.22 |

$r_{R1} = r_7 = 71.275$
$f_R = 74.17$
$r_{R4} = r_{10} = 82.006$ where $F_{NO}$: the aperture ratio or F-number;
$\omega$: half view angle;
r: the radius of curvature of an individual lens surface;
d: the thickness of an individual lens or the aerial distance between adjacent lenses:
n: the refractive index of an individual lens at the d-line;
$\nu$: the Abbe number of an individual lens; and
$f_B$: back focus.

10. A large aperture, medium telephoto lens system which is composed of a front group $G_F$ and a rear group $G_R$ said front group comprising, in order from the object side, at least two positive lens elements having a strong convex surface directed toward the object and a negative lens having a strong concave surface directed toward the image and which has a positive overall refractive power, and said rear group $G_R$ having a positive overall refractive power and having at least one lens element with a surface $S_{R1}$ which is the closest to the object being convex toward the object, with the front group $G_F$ and the rear group $G_R$ being moved together to perform focusing operations, the rear group $G_R$ comprises, in order from the object side, at least one positive lens element, a negative lens $L_{RN}$ in which the surface on the image side being concave toward the image, and at least one positive lens element, which lens system satisfies the following conditions:

$0.5 < f/r_{R1} < 3.5$     (1)

$0.6 < f_R/f < 1.1$     (2)

$0.8 < f/r_{R4} < 3.0$     (3)

where
f: the focal length of the overall system;
$f_R$: the focal length of the rear group $G_R$;

$r_{R1}$: the radius of curvature of $S_{R1}$ or the surface of the rear group $G_R$ which is the closest to the object; and $r_{R4}$: the radius of curvature of the image-side surface of the negative lens $L_{RN}$.

11. A large aperture, medium telephoto lens system which is composed of a front group $G_F$ and a rear group $G_R$, said front group comprising, in order from the object side, at least two positive lens elements having a strong convex surface directed toward the object and a negative lens having a strong concave surface directed toward the image and which has a positive overall refractive power, and said rear group $G_R$ having a positive overall refractive power and having at least one lens element with a surface $S_{R1}$ which is the closest to the object being convex toward the object, with only the rear group $G_R$ being moved along the optical axis to perform focusing operations, which lens system satisfies the following conditions:

$$0.5 < f/r_{R1} < 3.5 \qquad (1)$$

$$0.6 < f_R/f < 1.1 \qquad (2)$$

where f: the focal length of the overall system;

$r_{R1}$: the radius of curvature of $S_{R1}$; and $f_R$: the focal length of the rear group $G_R$.

12. The lens system according to claim 11, further satisfying the following condition:

$$0.7 < f_R/f < 1.0 \qquad (2')$$

where $f_R$: the focal length of the rear group $G_R$.

* * * * *